United States Patent [19]
Preston

[11] Patent Number: 4,714,575
[45] Date of Patent: Dec. 22, 1987

[54] METHOD FOR MANUFACTURING RIM COMPOSITES

[75] Inventor: Frank J. Preston, Hampton, N.H.

[73] Assignee: Ex-Cell-O Corporation, Walled Lake, Mich.

[21] Appl. No.: 867,162

[22] Filed: May 27, 1986

[51] Int. Cl.$^4$ .................. B29C 67/22; B29C 45/14
[52] U.S. Cl. ................... 264/46.4; 264/46.5;
264/257; 264/DIG. 83; 425/120; 425/127;
425/129 R; 425/543; 425/817 R; 428/71;
428/74
[58] Field of Search ............ 264/46.4, 257, DIG. 83,
264/46.5; 425/543, 817 R, 120, 127, 129 R;
428/71, 74

[56] References Cited
U.S. PATENT DOCUMENTS
3,918,863 11/1975 Rhodes, Jr. ..................... 425/117

Primary Examiner—Philip Anderson
Attorney, Agent, or Firm—John C. Evans

[57] ABSTRACT

A polyurethane RIM method has two mixheads. Reactants are brought to each mixhead and are supplied as separate streams to two spaced cavities in a mold having a pre-formed porous mat separating the two cavities. One stream contains an isocyanate, polyol, chain extender and crosslinker selected to have a very low viscosity and which reacts to produce a high modulus armature or load bearing member. The other stream contains a polyol and isocyanate with additives that have relatively high viscosity to produce a semi-rigid polyurethane foam. At each mixhead the proportions of ingredients are controlled to give a desired isocyanate index to control the flex modulus and other properties of the loading bearing member and foam molded components of the product. The low viscosity material penetrates the porous mat to reinforce it and the porosity of the mat prevents the high viscosity material from entering the armature cavity so as to reduce the load capacity of the finished product.

4 Claims, 4 Drawing Figures

METHOD FOR MANUFACTURING RIM COMPOSITES

THIS INVENTION

This invention is a multi-injection process for molding polyurethane products by reaction injection molding (hereinafter "RIM"). More particularly, this invention is a polyurethane molding system wherein first reaction ingredients are brought to a first RIM mixhead and mixed independently in the first mixhead in such proportions as may be desired to make a molded armature of high modulus physical properties for supporting a load. The molding system includes a separate source of reaction ingredients for supplying a second mixhead with isocyanate and polyol catalyzed materials to produce the semi-rigid foam material which is molded on the armature.

The present invention is a polyurethane RIM process with a mold having an open cavity member and a movable lid. The mold cavity is capable of rapid and repeated opening for de-molding the product and closing to receive the next shot. The reactants include the customary long chain polyol, a chain extender, a cross-linker, the isocyanate and usually additives such as a mold release agent and, in the case of the foam material, suitable foaming agents. The reactants are supplied to each mixhead from a common source of isocyanate.

A pre-formed outer skin is loaded into the open cavity member. A preformed glass mat of preselected porosity is supported in the mold after the skin is loaded. The mat has sufficient stiffness to be self-supporting.

The mat is located in the mold so that when the lid is closed it forms two separate mold cavities, one of which is supplied with a low viscosity mixture which reacts to form a high modulus armature and the other of which is supplied with a higher viscosity mixture that reacts to form a lower modulus semi-rigid foam material which backs the preformed skin and is molded to the armature. The low viscosity mixture and the porosity of the glass mat are selected so that the low viscosity material will penetrate into the porous mat while the porous mat prevents flow of the higher viscosity foam material into the upper cavity of the mold.

PRIOR ART

Injection molding of polyester liquid against opposite sides of a filler glass mat is shown in U.S. Pat. No. 2,903,388. Injection of plastic material between two glass mats to form insulation panels is shown in U.S. Pat. No. 3,309,450. Laminated sheet for plastic vehicle body panels is shown in U.S. Pat. No. 4,034,137.

U.S. Pat. No. 4,474,635 shows a cushioned panel in which molten material is forced into interstices of a surface fabric. U.S. Pat. No. 3,918,863 discloses simultaneously injecting first and second foamable materials into cavities formed by an imperious divider means. None of the aforesaid prior art method discloses formation of a RIM composite having a load-bearing armature and a foam-backed vinyl skin by a method including division of a single mold into two separate cavities by use of a porous divider and the step of selecting the porosity of the divider and the viscosity of two streams of RIM materials to control flow of material into the separate mold cavities defined by the porous divider formed therebetween.

Foamed articles with outer skins and load-supporting armatures have become widely used. For example, such articles are used for instrument panels in automobiles. Such RIM composites provide load support for instrument clusters supported on the armature while the foam layer and skin provide a high quality product appearance.

Heretofore the manufacture of RIM composite articles required a plurality of steps, that is, the outer shell was formed with a cavity disposed therein to receive a pre-formed vinyl skin which was inserted in the cavity of the mold, along with a pre-formed armature; then an inner core was foamed within the cavity. Examples of such articles and the prior method of manufacture are shown in U.S. Pat. Nos. 4,420,447, and 4,228,115. Such methods require a series of separate manufacturing processes, thereby increasing the cost and reducing the efficiency of the overall manufacturing operation.

It is therefore an object and feature of the instant invention to provide a mold method for the manufacture of composite RIM articles including an outer vinyl skin, a layer of RIM foam and a load-bearing high-modulus armature of RIM for supporting a load such as instrument clusters; and including the steps of disposing porous divider means within a mold cavity for dividing the mold cavity into at least two sections and providing passage means in communication with each of the sections and thereafter causing foamable RIM material to be injected on one side of the porous divider and a RIM polymer of low viscosity to be injected into another cavity to impregnate the porous divider with high modulus material while preventing migration of foam material into the armature space thereby to produce a load-support armature simultaneously with formation of a foam-backed exterior skin.

It is another object and feature of the instant invention to provide a method for manufacturing an instrument panel in a one-step operation, that is, once the mold has been prepared and closed, foamable skin backing RIM material and load-bearing armature RIM materials are simultaneously injected against opposite sides of a pre-formed porous mold divider so that a finished RIM composite is formed in one operation.

In conjunction with the foregoing object and features, it is another object and feature of the instant invention to provide a method for manufacturing interior automobile or truck parts with an exterior vinyl skin backed by foam and a high modulus load support armature which comprises the steps of injecting a first RIM material of low viscosity and high-modulus into a first mold cavity section which is divided from a second mold cavity section by porous divider means while simultaneously injecting a second foamable RIM material into the second section and simultaneously reacting and curing the first RIM material and foaming and curing the second foamable material so that an armature of desired form and physical characteristic is formed and bonded to the foam material by passage of the low viscosity RIM material into the porous divider.

Other objects and attendant advantages of the instant invention will be readily appreciated as the same become better understood by reference to the following detailed description when considered in connection with the accompanying drawings wherein.

Figure 1:
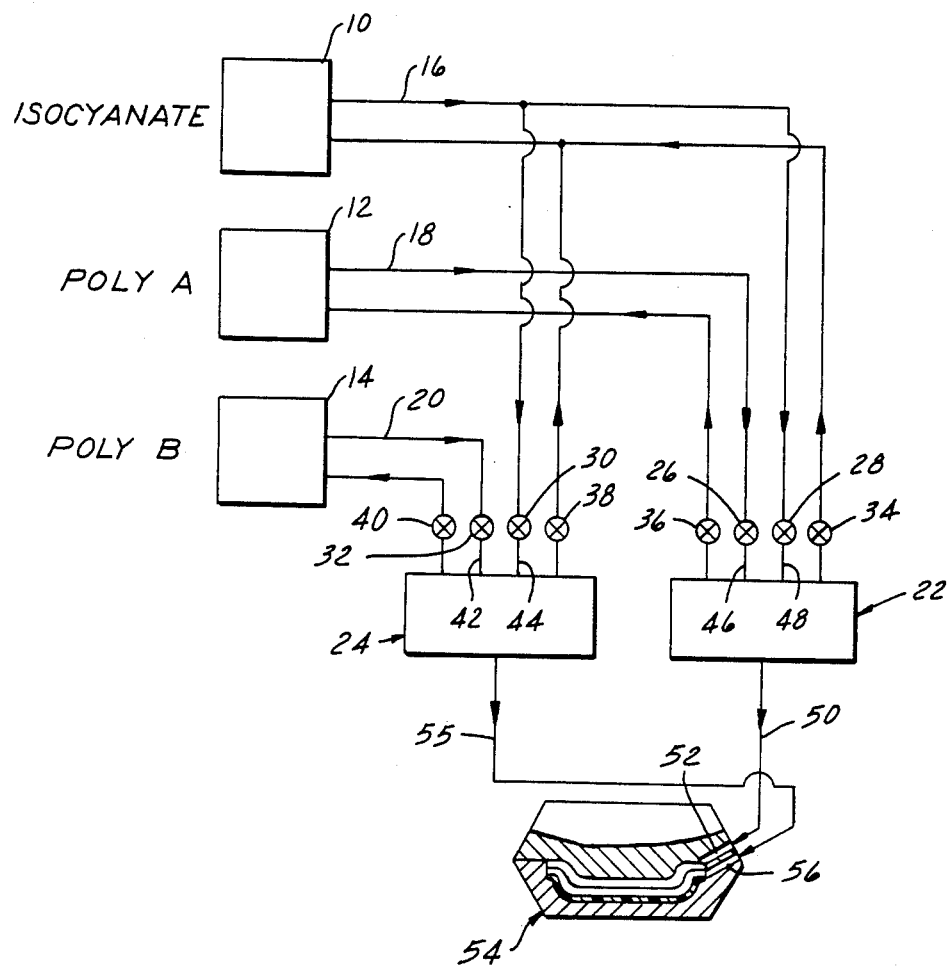
FIG. 1 is a diagrammatic view of a RIM mixing system used to practice the method of the instant invention.

With reference to the drawing, illustrated is a three-stream polyurethane RIM process for practicing the teachings of this invention. An isocyanate stream composed of an MDI prepolymer is prepared and stored at 10, a polyol stream A is prepared and stored at 12 and the polyol B stream is prepared and stored at 14. Each of these streams is conducted by manifolds 16, 18 and 20 to feed lines and hence to mixheads 22, 24, respectively, under control of supply control valves 26, 28 and supply control valves 30, 32. Mixheads 22, 24 have bypass control valves 34, 36 and 38, 40, respectively, to recirculate material during cure periods.

For mixhead station 24, the polyol B stream is introduced from line 20 by line 42 through control valve 32, and sufficient isocyanate from manifold 16 is added via line 44 and control valve 30 to give an isocyanate index of 80 to 105.

Similarly, polyol A is supplied to mixhead 22 via line 46 and control valve 26. Isocyanate is added by line 48 and control valve 28 to give an isocyanate index of 100 to 120.

The reaction injection molding mixture from outlet 50 of mixhead 22 is directed through inlet sprue 52 to a mold assembly 54 and the mixture from outlet 55 of mixhead 24 is directed through inlet sprue 56 to mold assembly 54. Usually, with this type of RIM process, injection or mold filling is completed in less than 5 seconds, and the product is de-molded in less than a minute thereafter. For example, the time from the initial mixing of the two ingredients in the mixheads to complete filling of the mold in each cycle may be less than 1.2 seconds. Cure times are quite rapid, and products may be de-molded from the molds in less than two minutes from the time of completion of injection into the molds.

Figure 2:
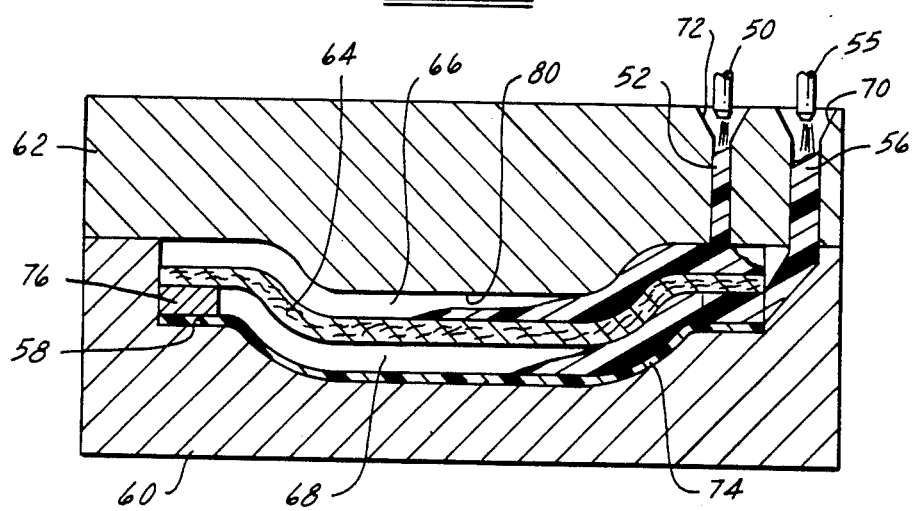
FIGS. 2–3 are diagrammatic views of the mold assembly for practicing the invention.
Figure 3:
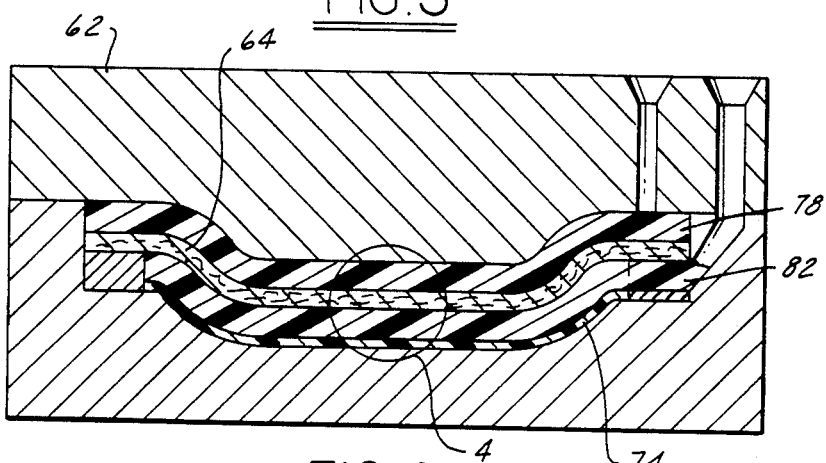

As shown in FIGS. 2 and 3, the mold assembly 54 has a mold cavity 58 defined by a female body member 60 and a cover member 62. The mold assembly is understood to include any standard clamping means (not shown) for holding and sealing the cover member 62 to the body member 60.

Within the mold cavity 58 and temporarily secured to the cover member 62 is a porous glass fiber divider 64. The divider 64 separates the mold cavity 58 into two sections, an upper or load-bearing armature defining space 66 and a lower or foam backing space 68. Glass fiber mat 64 has a preselected porosity that permits "low viscosity" material from mixhead outlet 50 to penetrate into the glass fiber mat as the upper open space 66 is filled with the reacting mix of polyol A and isocyanate but at a rate which will prevent any significant overflow into the foam space 68. The glass fiber mat has sufficient strength to support the weight of material inflow into upper open space 66. The porosity of the mat 64 is selected to prevent the "high viscosity" reacting material from mixhead outlet 55 from passing upwardly through the divider 64 into the space which is being filled with high strength armature material. Consequently, the divider 64 is impregnated mainly with high strength material to define a high strength interface boundary at the armature and foam cover.

The divider means 64 can be made of a variety of porous materials such as woven glass mat or porous board which will define and maintain the desired shape of the final armature section. Preferably, the divider 64 has enough rigidity to accurately maintain the load armature shape and the depth of the foam layer during mold fill and cure.

The mold cover member 62 includes pour hole or passage 70 which communicates through sprue 56 with the space 68 and a pour hole or passage 72 which is in communication with the space 66 through sprue 52.

When the mold cover member 62 is clamped in place with the divider 64 held within the mold cavity to define the armature space 66 and foam spaces 68, the mold assembly 56 is ready to receive the two separate flow streams.

In one application of the inventive process, an outer vinyl skin layer 74 is loaded into the female body member 60. The preformed glass divider 64, stiff enough to support its own mass, is then added to the cavity, but spaced a finite distance above the skin material by a spacer 76. Optional at this point, additional non-formed glass fiber may be added on top of the preformed divider. The lid of the mold is then closed to allow a net air-filled space defined by space 68 between the vinyl skin layer and divider 64 and an air-filled space between the divider 64 and the mold cover member 62.

By then using two separate mixheads, the "to be" armature component, polymer A, is introduced into the upper air space and the polymer B, is added to the lower air space. The function of the glass preform is to effect a barrier to migration of higher viscosity polyurethane from the lower space but allow migration of the low viscosity polymer A into the glass mat preform below it.

Polymer B is a material known in the art to form a polyurethane foam backing layer made by high pressure impingement mixing of isocyanate and polyol catalyzed materials. Polymer A is a polymer, such as polyurethane/polyester/polyamide/polyolefin made by the liquid RIM process, but of a very low viscosity to permeate the divider. Polymer A forms a high modulus weight supporting armature 78 for the resultant RIM composite product.

Figure 4:
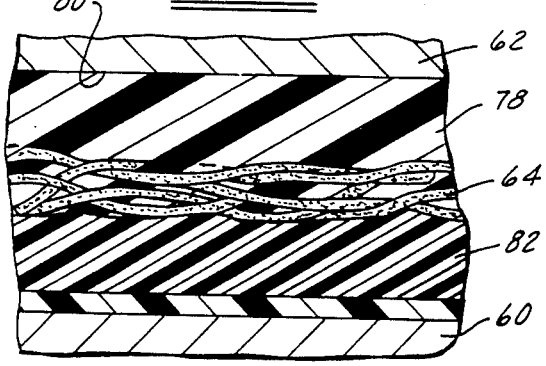
FIG. 4 is a fragmentary, enlarged sectional view of a composite RIM product formed by the invention.

The injection operation is timed so that as the materials fill the two sections of the mold cavity the divider 64 will not be distorted but will maintain its original shape to produce a desired armature shape. The duration and relative timing of the two shots of reacting polymeric material depend on the reactivity of each material used. The semi-rigid foamable material expands at a rate which causes no significant distortion or change in the position of the divider 64 and its viscosity is high enough to prevent significant intrusion into the armature region. The viscosity of the higher modulus material enables it to penetrate the divider 64 so that the divider becomes an integral part of the armature. The inflow is at a rate that prevents the high viscosity material from passing into the pores of the divider and which permits the low viscosity material to penetrate the pores of the divider without significant amounts of the low viscosity material mixing with the high viscosity material. The resultant article includes the armature 78, a polyol A impregnated divider 64 and a semi-rigid foam layer 82, all shown in FIG. 4.

The materials having been injected are allowed to cure as is the normal practice. The RIM composite article is then removed from the mold cavity and the divider with its impregnation of polymer A material remains an integral part thereof. It is to be understood that the divider 64 may be selected for its contributory physical properties; that is, the thickness, composition, or design may be varied to allow it to contribute to the load support capabilities of the composite article.

The method is not restricted to two-layer articles because it is obvious that additional divider means and pour holes may be provided so that three or four layers of high modulus material and foam material may be produced.

By the method and provisions thereof set forth in the preceding description, a method for manufacturing a composite RIM article and in particular a load support armature and foam backed skin covered interior automobile part is disclosed.

While a novel method and mold assembly for manufacturing a specific form of RIM article have been illustrated and described in the foregoing specification and accompanying drawings, it should be understood that the invention is not limited to the exact method and assembly shown but that various alternatives in the construction and form are possible.

What is claimed is:

1. In a method of manufacturing a composite RIM article, by use of a RIM mold with a female body including a cavity therein separated by a divider to divide the cavity into lower and upper air-filled spaces which are filled respectively with a low viscosity RIM mixture and a high viscosity RIM mixture by simultaneously injecting the respective mixtures as separate streams into one or the other of the lower and upper air-filled spaces in an amount to fill such spaces, the improvement comprising: preforming the divider from glass fibers to form open pores throughout the divider; filling one space receiving the high viscosity material at a rate which prevents it from passing into the pores of the glass fibers; and filling the other space at a rate which permits the low viscosity material to penetrate and fill the pores of the glass fibers without passing into the one space to prevent significant amounts of the low viscosity material mixing with the high viscosity material; and reacting the RIM materials in the mold to concurrently form a high strength armature in the space receiving the low viscosity material, a foam cover in the other space and a high strength interface boundary therebetween.

2. In the method of claim 1,
   selecting said low viscosity RIM material to have an isocyanate index in the range of 100 to 120 to produce a load carrying member in the composite RIM article.

3. In the method of claim 1,
   selecting said high viscosity RIM material to have an isocyanate index of 80 to 105 to produce a semi-rigid foam layer in the composite RIM article.

4. In the method of claim 1, said low viscosity materials selected from the chemical group consisting of: polyurea, polyester and polyamide.

* * * * *